Sept. 6, 1960     D. E. LUNDEEN ET AL     2,951,342
ELECTRO-HYDRAULIC SERVO SYSTEM
Filed Nov. 14, 1957     4 Sheets-Sheet 1
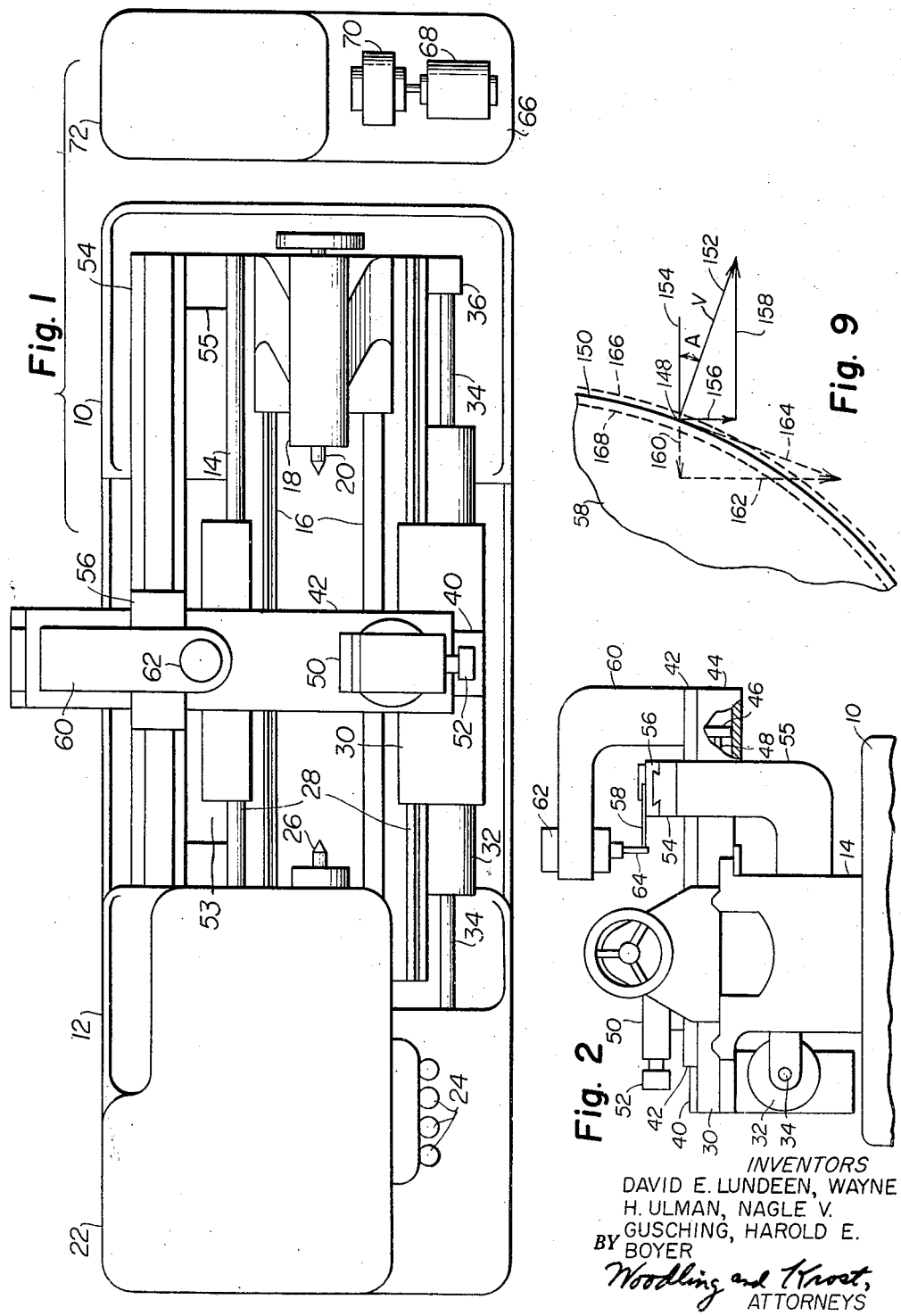
INVENTORS
DAVID E. LUNDEEN, WAYNE H. ULMAN, NAGLE V. GUSCHING, HAROLD E. BOYER
BY Woodling and Krost
ATTORNEYS

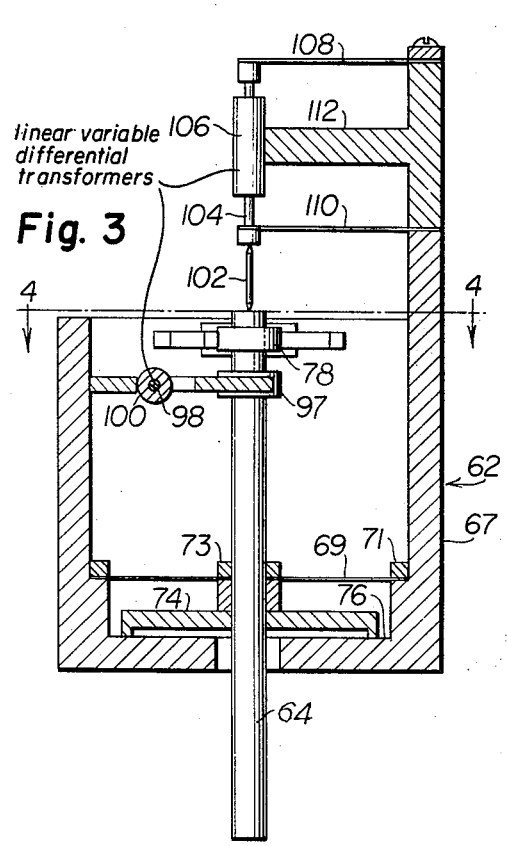

Sept. 6, 1960  D. E. LUNDEEN ET AL  2,951,342
ELECTRO-HYDRAULIC SERVO SYSTEM
Filed Nov. 14, 1957  4 Sheets-Sheet 3

INVENTORS
DAVID E. LUNDEEN
WAYNE H. ULMAN
NAGLE V. GUSCHING
BY HAROLD E. BOYER

Woodling and Krost,
ATTORNEYS

Sept. 6, 1960     D. E. LUNDEEN ET AL     2,951,342
ELECTRO-HYDRAULIC SERVO SYSTEM
Filed Nov. 14, 1957     4 Sheets-Sheet 4

INVENTORS
DAVID E. LUNDEEN
WAYNE H. ULMAN
NAGLE V. GUSCHING
HAROLD E. BOYER

BY *Woodling & Krost,*
ATTORNEYS

United States Patent Office

2,951,342
Patented Sept. 6, 1960

2,951,342

ELECTRO-HYDRAULIC SERVO SYSTEM

David E. Lundeen, Sidney, Wayne H. Ulman and Nagle V. Gusching, Clinton Township, Shelby County, and Harold E. Boyer, Anna, Ohio, assignors to The Monarch Machine Tool Company, Sidney, Ohio, a corporation of Ohio Filed Nov. 14, 1957, Ser. No. 696,466

17 Claims. (Cl. 60—52)

This invention relates to a control system for machine tools wherein it is desired that the cutting tool of the machine tool be moved in relation to the workpiece in a manner dictated by a template or a master form whereby the shape of the template is reproduced on the workpiece.

The control system is electro-hydraulic in nature. The electrical parts of the system are used for control and the hydraulic parts are used for power purposes. Two slides are controlled and these two slides are shown as the carriage and cross slide of a lathe but it is readily apparent that such slides may be those of other types of machine tools.

It is an object of this invention to provide an economic tracer control system for machine tools and more particularly, lathes.

It is another object of this invention to provide a tracer control system that accurately reproduces the shape of the template upon the workpiece.

It is a further object to provide a system wherein the direction of deflection of the tracer controls the direction of tool motion.

It is another object to provide a tracer control system which includes a correction system operating from a signal in the tracer head which keeps the tracer deflection constant.

It is a further object of this invention to provide a tracer head that offers directional signals which can be interpreted to indicate the direction of motion of the tool and stylus which is tangential to the template surface, and a deflection signal which corrects the direction when it is not tangent to the template surface.

It is a further object of this invention to provide a constant deflection tracer system.

It is another object to provide means to control the rate of motion in the direction dictated by the direction signals.

It is another object of the invention to provide the system with rate control feedback so that feed rate is maintained substantially constant.

It is another object of the invention to provide a rate transducer which provides a signal corresponding to the rate of motion.

It is a further object to provide a tracer control system which is inter-related in such a manner that the direction system is not adjusted for feed rate control.

It is another object of the invention to provide a tracer control system wherein the direction indicating system is not affected by changes in the rate indicating system, and conversely the rate indicating system is not affected by changes in the direction indicating system.

It is another object of the invention to provide a tracer and pattern control system wherein tracer finger movements in first and second perpendicular paths provide signals which are cross-connected to provide primary control of movements of the tracer in the second and first paths, respectively, and wherein corrective signals are again cross-connected and further modified in accordance with the total vector summation of finger movements in the first and second paths in order to maintain substantially constant finger deflection.

It is another object to improve the responsiveness and linearity of the system by making all rate control adjustments independent of the direction system.

Further objects and advantages of this invention are readily apparent upon reading the following specification and referring to the attached drawings in which:

Figure 1 is a plan view of a lathe arranged for control by the instant invention;

Figure 2 is an elevational view from the tailstock end of the lathe;

Figure 3 is a vertical sectional view taken on the line 3—3 of Figure 4 showing a sectional elevation of the tracer head;

Figure 4 is a partial sectional plan view from the top of the tracer taken on the line 4—4 of Figure 3;

Figure 5 is a sectional elevation of the flow rate transducer taken on the line 5—5 of Figure 6;

Figure 6 is a plan view of the flow rate transducer shown in section in Figure 5;

Figure 7 is an enlarged detail of the flow rate transducer of Figure 5;

Figure 9 is a section of a circular template showing the deflection and direction vectors which represent the signals transmitted by the tracer head.

Figure 8:
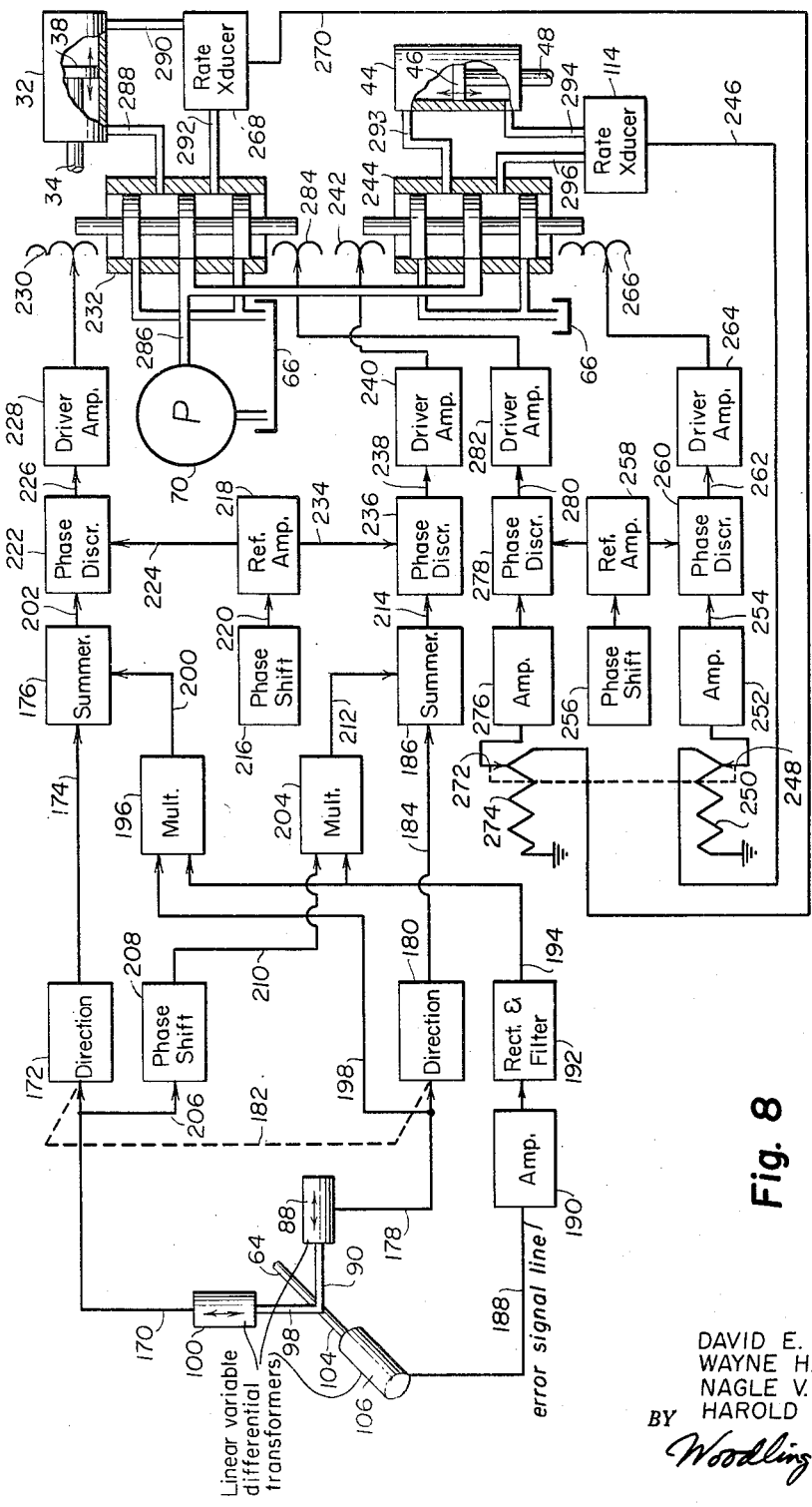
Figure 8 is a complete block diagram showing the electrical and hydraulic parts and their inter-relationship of the present invention.

Referring now to Figures 1 and 2, a lathe adapted to be controlled by the instant control system is shown. A tailstock leg 10 and headstock leg 12 support a bed 14. The bed 14 is suitably provided with ways 16 which support a tailstock 18. Center 20 is suitably mounted in the tailstock 18 to support an end of the workpiece (not shown). On the other end of the bed 14 is mounted a headstock 22 arranged to drive the workpiece in rotation. This is normally accomplished by an electric motor driving the headstock power input and the headstock contains a plurality of gears of different selectable gear ratios to drive the workpiece at the selected speed. Handles 24 are arranged to control the selectable gear trains in the headstock. A center 26 is provided to support the other end of the workpiece and suitable means are provided to rotate the workpiece. These means may be a chuck or dog and dog plate or other common driving means.

The bed 14 is also provided with ways 28 upon which are reciprocally mounted a carriage 30. The carriage 30 is moved along the bed by means of a cylinder 32 connected to the carriage and a piston rod 34 connected to the bed through intermediate means such as rod bracket 36. The cylinder 32 contains a piston 38, Figure 8, which is arranged for substantially liquid tight sliding motion therein and is connected to piston rod 34.

On the top of carriage 30 are provided ways 40 which extend substantially transversely of the bed or at right angles to the workpiece axis of the lathe, which axis is defined by the centers 20 and 26. The ways 40 support a cross slide 42 which has secured thereto a cylinder 44. The cylinder 44 contains a piston 46 which is secured relatively to the carriage 30 by means of a piston rod 48. This cylinder, piston rod combination comprises a motor for moving the cross slide 42 relative to the carriage 30. Mounted upon the cross slide 42 is a compound rest or top slide 50 which is adapted to support the tool used for cutting the workpiece to the desired shape. The top slide may be adjusted angularly as is common in the art and may be adjusted manually by means of handwheel 52 to make tool adjustments.

A template rail 54 is supported on the back of the bed 14 by means of template rail support brackets 53 and 55. Superposed upon the template rail 54 is a template holder 56 which suitably mounts a template 58 in manually adjustable relationship to the bed. Tracer head support arm 60 is mounted on the cross slide 42 and carries a tracer head 62. The tracer head carries a tracer finger or stylus 64 which is arranged to cooperate with the template 58 and direct the motion of the cylinders 32 and 44 in such a manner that the tool mounted on the compound 50 and the tracer finger 64 follow the shape of the template 58.

Adjacent the tailstock leg 10 is a hydraulic sump 66 upon which is mounted a motor 68 suitably arranged to drive a hydraulic pump 70 which takes suction from the sump 66 and discharges hydraulic fluid under pressure to the hydraulic system of the tracer circuit. Pump 70 may be suitably protected by a relief valve (not shown). Mounted on one end of the sump 66 is an electrical cabinet 72 arranged to contain the electrical portions of the tracer system.

The tracer head 62 is shown in more detail in Figures 3 and 4. The body 67 of the tracer head 62 is arranged to be mounted and the tracer support arm 60 carries the mechanical and electrical parts necessary to derive a proper set of electrical signals from the tracer finger deflection. The tracer finger 64 is mounted to extend below the tracer body 67 and is secured relatively thereto by means of a diaphragm 69 which is secured to the body 67 by a ring 71 and to the tracer finger 64 by another suitable ring 73. The diaphragm 69 serves as a frictionless pivot for the tracer finger 64. It can be seen that sideways motion of the tracer finger, where it extends from the body 67, will cause sideways motion of the upper end of the tracer finger 64. Vertical motion of the tracer finger is provided by a swash plate 74 which bears on a suitable surface 76 of the housing 66. Sideways deflection of the tracer finger 64 thus also causes upward motion of the tracer finger as a function of the sideways deflection. A suitable bearing 78 is mounted on the tracer finger and this bearing is engaged by a frame 80 carrying a finger 82. The frame 80 is mounted by flat springs 84 and 86 relative to the body 67 so that the frame 80 moves in accordance with the amount of deflection in a horizontal direction in Figure 4. This frame thus moves in accordance with the component of tracer deflection extending in that plane. Mounted in the housing 67 is a linear variable differential transformer 88. The core 90 of the transformer is secured to the frame 80 by means of fingers 92 and 93 so that the movement of the core 90 is a function of the tracer finger deflection in that plane. Similarly, and mounted at ninety degrees thereto, is a frame 94 which has a finger 96 operating on a bearing 97. The frame 94 controls the core 98 of linear variable differential transformer 100. This transformer corresponds to the component of deflection which is at ninety degrees to the deflections sensed by transformer 88.

The top of the tracer finger 64 contains a small hole in which bears pin 102. This pin 102 also engages the core 104 of linear variable differential transformer 106. The core is mounted for vertical motion by means of flat springs 108 and 110 and the transformer 106 is secured to the body 67 through arm 112.

The linear variable differential transformers 88, 100, and 106 are well known in the art and comprise energizing primary windings as well as a pair of oppositely phased secondary or output windings. An iron core is moved through the windings and energization of the primary energizes the two secondary windings to different extents which depend upon the core position. When the core is centered, the secondary outputs are equal in amplitude and oppositely phased so that if they are series connected, the net amplitude is zero. Of course, some harmonic output is always present due to harmonics in the energizing circuit and slight unbalance in the transformer secondary. Suitable adjustments may be provided so that the transformer windings or cores may be adjusted to the proper mechanical position for optimum tracer performance.

Figures 5 through 7 show the flow rate transducer which is a part of the feed rate control portion of the present tracer system. The flow rate transducer has a body 114 containing a cavity 116. As shown in Figure 6, a cover 118 is normally secured to the body 114 to enclose the cavity 116. A fluid connection 120 is connected to the cavity 116 and to the hydraulic circuit as is shown hereinafter. The fluid flows through orifice 122 in plate 124 and cover 126 confines the fluid and directs it into the fluid conduit 128 which is also connected to the hydraulic circuit.

The orifice plate 124 is shown in more detail in Figure 7 wherein it is seen that a cylindrical section 130 is adjoined on each side by tapered sections 132 and 134. Located on the inside of the orifice and having a slight clearance therein is a double conical member 136 which has a stem 137 extending into the cavity 116. The member 136 and stem 137 are supported for motion in the cavity by means of flat springs 138 and 142 which are secured to the body 114 by means of bracket 144. It is desired to relate motion to velocity by means of the pressure drop through the orifice 122. This function is normally a power relation such as $P=Q^K$. In the case of hydraulic oil in an orifice of this nature, K varies between 1.5 and 2.0 with the result that no specifice curve can de delineated. While obtaining such a curve is theoretically desirable, it has been determined that the orifice shape previously described approaches the theoretically desirable curve sufficiently closely to operate without appreciable error.

A linear variable differential transformer 140 is mounted within the cavity 116 by means of a suitable frame 146. The stem 137 carries both the differential transformer core and the sensing element 136 within the orifice 122. The frame 146 may be adjustable so that it can be correctly positioned with respect to the core.

Referring now to Figure 9, a section of the template 58 is shown therein and in the present drawing the template 58 is shown to be circular in shape, but it is understood that the shape of the template corresponds to the desired profile of the workpiece. Furthermore, a master workpiece, which is merely a physical representation of the desired shape, could alternatively be used.

The point 148 represents the stylus or tracer finger 64 and the point 148 follows the profile 150 of the template 58. Ignoring friction, the tracer finger deflects along a line perpendicular to the surface of the template where it is contacting, and this deflection is represented by a vector V identified by the indicia 152. As shall be later described, this vector remains substantially constant in amplitude. By means of the transformers 100 and 88 this deflection vector V is divided into its two components along rectangular coordinates. If the angle of the vector V is taken as A below an arbitrary horizontal reference line 154, then the components of the vector 152 are $V$ sine $A$ as indicated at 156 and $V$ cosine $A$ as is indicated at 158. For the tool to cut a surface corresponding to the pattern shape at the point 148, it is necessary that the tool be moving along a tangent to the template at this point, which is a direction perpendicular to the deflection vector 152. It is clear that if a tangent to the template profile is desired, these vectors must be shifted through ninety degrees. Thus, if vector 156 is shifted to the position indicated by vector 160 and the vector 158 is shifted to the position shown by vector 162, then the resultant vector 164 is tangent to the template profile. Shifting the vectors through ninety degrees is easily accomplished as is hereinafter described, by connecting the direction signal emitted from transformer 100 which is represented by the vector 156, to the longitudinal slide which is operated by motor 32. Similarly, the vector 158, which is the component detected by transformer 88 is connected to control the cross slide cylinder 44.

If, by the introduction of some error such as friction at the tracer point, the length of vector 152 is changed, a correction must be applied to bring the deflection back to a constant value. A constant tracer deflection is necessary to maintain the tool and tracer tip relationship correct for the particular template workpiece conformation, as is well known in the art. If the vector 152 was deflected as if from a template surface 166, Figure 10, it would mean that the tracer finger was over-deflected and similarly, if it was deflected as if from a surface 168, Figure 11, it would means that it was under-deflected.

Figure 10:
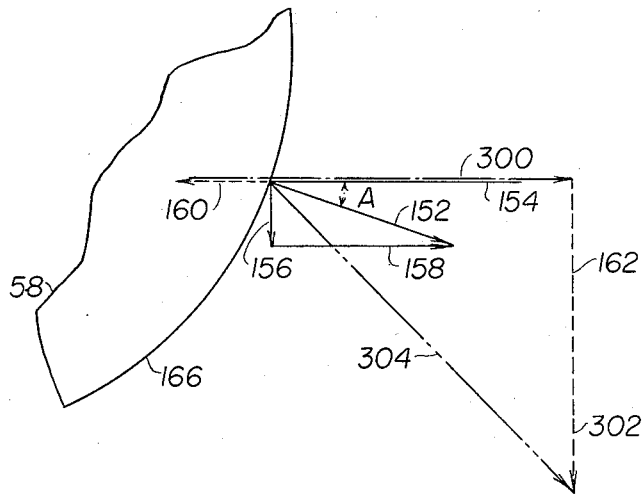
Figures 10 and 11 graphically portray conditions during tracing.
Figure 11:
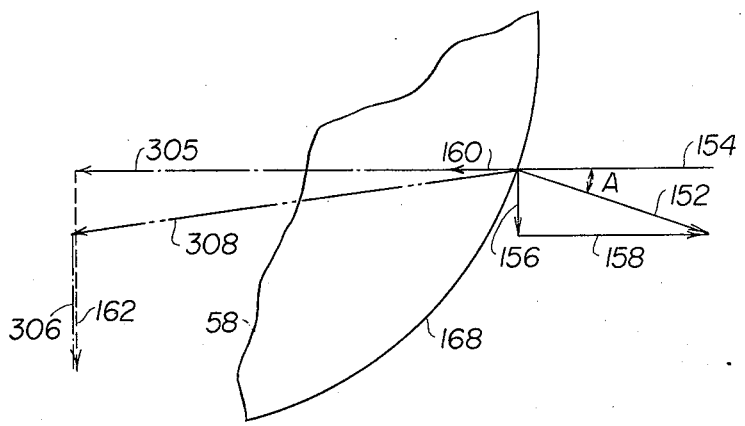

Figures 10 and 11 show the manner in which the correction vectors are added to the basic command direction for the over-deflected and under-deflected conditions, respectively. Corrections should be applied in a direction normal to the template, and accordingly, corrections in the carriage circuit are applied in the direction of and proportional to vector 158 and corrections in the cross slide circuit are applied in the direction of and proportional to vector 156. An inspection of Figure 9 shows that the resultant of vectors 156 and 158 is the vector 152 which is normal to the template surface. The manner in which these corrections are effected is hereinafter described in more detail.

Referring now to Figure 8, the transformer 100 is energized by a suitable oscillator power supply connected to its primary winding and its output 170 corresponds to $V$ sine $A$ (156 in Figure 9). This output 170 is connected to a directional switch 172 which determines which way the tracer shall go around the template. The directional switch amounts to a one hundred eighty degree phase shift. Thus, line 174 carries the $V$ sine $A$ signal to a summer, adder or totalizer 176. Similarly, the transformer 88 has its primary energized by an oscillator and its secondary supplies the signal $V$ cosine $A$ (158 in Figure 9) to line 178. This passes through a directional switch 180, which is a companion to the switch 172 and also represents a one hundred eighty degree phase shift when actuated. The directional switches 172 and 180 are mechanically or electrically related by a means 182 so that they are both actuated at the same time. The $V$ cosine $A$ signal is transmitted through line 184 to another summer 186.

The transformer 106 emits a signal indicating the amount of error in the amount of tracer deflection from the desired constant value represented by vector 152. This transformer 106 also has its primary oscillator energized and transmits from its secondary an error signal to line 188. After amplification in amplifier 190 it is transmitted to unit 192. This unit rectifies and filters the error signal to make a direct current error signal E from the alternating current input signal. The direct current error signal E is biased by a reference voltage $-R$ so that the resultant output is $E-R$. The reference voltage $-R$ indicates the desired correction of deflection of the finger 64 to result in the vector 152, so that when the vector is of the correct magnitude the $E-R$ signal is zero. When the vector is longer than desired, indicating overdeflection, E is larger than the absolute value of $-R$ and the error signal is positive. Conversely, when the vector is shorter than desired, indicating underdeflection, E is smaller than the absolute value of $-R$ to result in a negative error signal. The signal $E-R$ is thus supplied to line 194, but it can be readily seen that the $-R$ reference could be applied at the multipliers 196 and 204. Multiplier 196 is supplied with the error signal $E-R$ through line 194 and with the $V$ cosine $A$ signal through line 198. The multiplier then emits an $(E-R)V$ cosine $A$ signal to line 200 which is an input to summer 176. The summer 176 algebraically adds the input signals from lines 174 and 200 and emits to line 202 a signal corresponding to $V$ sine $A$ plus $(E-R)V$ cosine $A$. In similar manner, the multiplier 204 receives the signal $E-R$ from line 194 and the signal $V$ sine $A$ through line 206, one hundred eighty degrees phase shifter 208 and line 210. The phase shifter 208 is required to correct the error sign so that the error is corrected in the right direction. The multiplier 204 takes these signals and emits to line 212 a signal $(E-R)V$ sine $A$ to the summer 186. The summer algebraically adds these signals and emits to line 214 the signal $V$ cosine $A$ plus $(E-R)V$ sine $A$.

As was previously discussed, the differential transformers 88 and 100 create signals which correspond to oppositely phased waves on opposite sides of the deflection center point which have increasing amplitude as deflection away from the center point increases. It thus becomes necessary to determine which phase is being emitted from the transformers so that it can be determined which side of the center point the transformer core is deflected. This is accomplished by a reference phase supplied by a phase shifter 216 which supplies a reference amplifier 218 through line 220. The signal in line 202 is transmitted to a phase discriminator 222 which is also supplied by the reference phase from reference amplifier 218 through line 224. The phase discriminator emits to line 226 a signal in the form of a variable voltage of constant sign corresponding to the signal in line 202. The signal in line 226 supplies and controls the driver amplifier 228 which in turn supplies the coil 230 of electro-hydraulic relay valve 232. The reference amplifier 218 also supplies the reference phase through line 234 to phase discriminator 236 which emits a constant sign output voltage to line 238 corresponding to the signal in line 214. The signal in line 238 controls the driver amplifier 240 which in turn controls the coil 242 of electro-hydraulic valve 244.

The rate transducer 114 is connected in series between the valve 244 and the cylinder 44. The velocity of the piston 46 is substantially proportional to the oil flowing to the cylinder. The oil flow displaces the sensing member 136 of the transducer 114 and the transformer 140 thus emits a signal to line 246 indicating the velocity of motion of piston 46. The transformer 140 is again a linear variable differential transformer energized in its primary by an oscillator and its secondary emits a signal the amplitude of which is proportional to fluid velocity and the phase of which is dependent on fluid flow direction. The line 246 is connected to a potentiometer 250 which is connected on one end to ground and the movable tap 248 of which is connected to amplifier 252. This amplifier emits a signal to line 254 of the type previously mentioned. A phase shifter 256 supplies a reference phase to the reference amplifier 258 and the amplified reference phase is supplied to a phase discriminator 260 along with the signal in line 254. The output signal of discriminator 260 in line 262 is a variable voltage of constant sign and is supplied to a driver amplifier 264 which in turn energizes coil 266 of valve 244.

A similar rate transducer 268 is connected in series with the valve 232 and the motor 32 and emits a signal to line 270, the amplitude of the signal being substantially proportional to the rate of motor 32 velocity and the phase of the signal indicating the direction of motion. Line 270 is connected to a potentiometer 274 which is connected to ground and the movable tap 272 of which is connected to an amplifier 276. The taps 248 and 272 are ganged together for mutual operation. The amplifier 276 supplies the phase and amplitude signal to phase discriminator 278 which compares the reference phase from amplifier 258 to the phase discriminator input to make an output in line 280 of variable voltage of constant sign. Line 280 supplies driver amplifier 282 which energizes coil 284 of valve 232.

The hydraulic pump 70 supplies fluid under pressure to a line 286 which is connected to the center port of each of valves 232 and 244 to supply fluid pressure thereto. These valves are common 3-land reversing valves and their structure and operation are well known in the art. These valves are shown as directly operated by solenoids as proportioning valves. That is to say, that the amount of valve stem motion, and the amount of fluid flow, are proportional to the energization to the controlling coils. Such valves are commercially available both as directly operated valves as shown, or as operated by a servo system, as is shown in patent application Serial Number 640,422, filed February 15, 1957. The valve structure is thus considered representative of the electrically actuated servo valves which are connected to operate cylinders. More particularly line 288 supplies one end of cylinder or motor 32 and other end of the cylinder 32 is connected by line 290 to the flow rate transducer 268 which is also connected by line 292 to the other cylinder connection of valve 232. Similarly, valve 244 is connected by line 293 to the cylinder or motor 44 which has its other end serially connected by line 294 through the rate transducer 114 and line 296 to the other cylinder port of valve 244.

The operational characteristics have been described in particular with the description of the block diagram of Figure 8. It was there seen that the driver amplifier 228 emitted a signal to coil 230 which corresponded to the correct directional vector amplitude modified by an error correcting amplitude and its correct direction. Similarly, the driver amplifier 240 transmitted a signal to the coil 242 which corresponds to the cross slide directional vector amplitdue modified by a correcting vector at right angles thereto. With this construction, the valves would be actuated to amounts which correspond to the proper direction of tool and tracer finger travel. Feed rate control is accomplished by obtaining a signal from the rate transducers which signal tells the direction and velocity of each motor motion. The potentiometer taps 248 and 272 take as much of this signal as is desired for the particular feed rate. These signals are fed through the corresponding coils 266 and 284 to control the amount of valve travel with respect to the desired feed rate. The potentiometer taps 248 and 272 control the feed rate, for when the rate transducers send down a signal which shows that one or both motors are operating too slowly, one or both coils 266 and 284 are under-energized to permit more valve deflection, to permit more fluid flow which in turn maintains the feed rate constant.

It is thus a balance between the directional vectors corrected by any error signal which supply the directional sense to the valves and the feed rate transducers which signal the amount of relative flow to the valves. By this means, tracing around the template proceeds with an accurate trace at a constant rate. Feed rate control is accomplished without adjustment of the directional equipment and thus the directional equipment is permitted to operate at substantially one level which minimizes difficulties of balancing and phase shifting when feed rate control is attempted in that area.

The operation of the device has been described during the description of the structure of this system with reference to Figure 8. However, Figures 9, 10, and 11 further illustrate the interaction of the components for a description from a different approach. Referring now to Figure 9, it has been previously shown that the tracer finger 64 ideally deflects along a vector 152. This vector is perpendicular to a tangent to the template surface 150 at point 148 which is the contacting point of the template finger 64. By a simple cross connection, the vector 156 controls the motion of the carriage and thus it action is shifted ninety degrees as shown by vector 160. Similarly, the component 158 of the vector 152 is shifted through ninety degrees by connecting it to control the cross slide and thus becomes the vector 162. The resultant of the vectors 160 and 162 is seen at 164 and is tangent to the template surface 150 at point 148.

Should the tracer finger 64 be deflected slightly more than is desired, as if from a surface 166, to be in an over-deflected condition, the addition of the vectors is shown in Figure 10. Here again the vector 152 illustrates the deflection of the tracer finger and is divided into vectors 156 and 158 controlling the carriage and cross slide, respectively. Vector 160 is the vector 156 shifted through ninety degrees and represents the signal in line 174 of Figure 8. Since the tracer is overdeflected, the signal E is larger than —R so that the signal $(E-R)V$ cosine $A$ in line 200 is positive and in a direction parallel to and a multiple in magnitude of vector 158. The vector $(E-R)V$ cosine $A$ is shown in Figure 10 at 300. For the purposes of illustration, the magnitude of vector $E-R$, and the gain of multiplier 196, result in a vector 300 which is shown as twice as long as the vector 158. Different values of E would, of course, change the length of vector 300 until, when E equals —R, the vector 300 has a zero magnitude. The vector 300 is algebraically added to vector 160 in the summer 176.

The vector 158 is again shifted ninety degrees to be the vector 162, in the manner previously described, and added to this in the summer 186 is the vector 302 which is $(E-R)V$ sine $A$. The resultant is vector 304 which moves the tracer head 62 away from the template to decrease the excess finger deflection until $E-R$ equals zero.

Figure 11 illustrates the underdeflected situation where the tracer head 62 is too far away from the template surface 168. Similar direction vectors are present in the form of vector 152 which is substantially normal to the surface of template 58 at the point of contact of tracer finger 64. Vector 152 is resolved into components 156 and 158. Vector 156 is rotated ninety degrees to become vector 160 as is previously described, and added to it in the summer 176 is vector 305 which represents $(E-R)V$ cosine $A$ when E is less in absolute magnitude than —R. Thus the value $E-R$ is negative and shifts the direction of vector 158 by one hundred eighty degrees. Again the value $E-R$, along with the gain of the multiplier, is chosen as 2, for purposes of illustration, so that the vector 305 is twice as long as vector 158. Vector 162 is the vector 158 shifted through ninety degrees and added algebraically to it in summer 186 is the vector 306 which represents $(E-R)V$ sine $A$. The resultant 308 indicates the direction and magnitude of velocity of the tracer head 62 at this instantaneous condition, and as the tracer head moves toward the surface of the template 58, the value $E-R$ approaches zero and, accordingly, the vectors multiplied thereby approach zero until the condition of operation again resembles Figure 9. By selecting the proper multiplier gain, the amount of the tracer head deviation from the desired path is minimized.

This invention has been described in this preferred embodiment and it is clear to those in the art that numerous modifications or alternatives might be made in the preferred embodiment without effecting the nature and scope of the invention. It is thus desired that the scope of the invention be described by the following claims.

What is claimed is:

1. In a tracer system, a pump to supply fluid under pressure, a tracer, an infinitely variable directional valve connected to said tracer and connected to said pump to control said fluid under pressure, a motor connected to said directional valve in such a manner that said directional valve controls the velocity of motion of said motor, and a flow rate transducer serially connected between said motor and said directional valve, said flow rate transducer being connected to said directional valve and arranged to urge said directional valve to keep the flow rate constant.

2. In a tracer system, a flow rate transducer, a motor and an infinitely variable directional valve connected in series, a tracer connected to said directional valve, a pump to supply fluid under pressure to said directional valve which thus controls said motor, said flow rate transducer measuring the amount of flow to said motor, said flow rate transducer comprising an orifice and a sensing member located in said orifice, the position of said sensing member with respect to said orifice being dependent upon the flow through said orifice, and signal means connected to signal the position of said sensing member with respect to said orifice whereby the rate of flow of the fluid under pressure to said motor is measured.

3. In a tracer system, a flow rate transducer, a motor and an infinitely variable directional valve connected in series, a tracer connected to said directional valve, a pump to supply fluid under pressure to said directional valve which thus controls said motor, said flow rate transducer measuring the amount of flow to said motor, said flow rate transducer comprising an orifice and a member located in said orifice, the position of said member with respect to said orifice being dependent upon the flow through said orifice, and signal means connected to signal the position of said member with respect to said orifice whereby the rate of flow of the fluid under pressure to said motor is measured, said signal means being connected to said directional valve to maintain the rate of flow substantially constant.

4. In a tracer system, a fluid motor, fluid pressure supply and control means for supplying fluid under pressure to said motor, a flow rate transducer serially connected between said fluid pressure supply and control means and said motor, said flow rate transducer including an orifice, a member in said orifice arranged so that the position of said member with respect to said orifice is dependent upon the fluid flow to said motor, and signal means to signal the position of said member with the respect to said orifice, said signal means being connected to control said fluid pressure supply and control means.

5. The structure of claim 4 wherein said orifice is non-cylindrical.

6. In a tracer control circuit, a pump to supply fluid under pressure, means to control the flow of fluid under pressure, a motor connected to said fluid pressure control means, a flow rate transducer serially connected between said fluid flow control means and said motor, said flow rate transducer supplying a signal indicating the rate of flow of fluid to said motor, and said signal being amplified and connected to said fluid flow control means.

7. The structure of claim 6 wherein said signal is electric and said fluid flow control means is an electrically controlled valve.

8. In a tracer control system, a tracer head having a tracer finger arranged to cooperate with a template and deflectible throughout three hundred sixty degrees in the plane of the template, a signal device in said tracer head to signal the deflection component of said finger along a first plane at right angles to the plane of said template, a second signalling device in said tracer head arranged to signal the deflection component of said finger in a second plane at right angles to the plane of said template and to said first plane, a third signalling device in said tracer head connected to said tracer finger and adapted to measure deflections parallel to the plane of the template in any plane perpendicular to the plane of said template, and means responsive to the signals produced by said first, second and third signalling devices to move said tracer head with respect to said template substantially parallel to the plane of said template.

9. In a tracer control system, a tracer head arranged to cooperate with a template, said tracer head having a tracer finger which is deflectible throughout three hundred sixty degrees in the plane of the template, a first signalling device in said tracer head to signal the deflection component of said finger along one plane at right angles to said template, a second signalling device in said tracer head arranged to signal the deflection of said finger in a second plane at right angles to said template and to said one plane, and a third signalling device in said tracer head connected to said tracer finger and adapted to measure deflections in any plane perpendicular to said plane of the template, said second signalling device controlling motion of said tracer head relative to said template in a first direction, said first signalling device controlling motion of said tracer head relative to said template in a second direction and said third signalling device maintaining the vector sum of said deflections substantially constant.

10. In a tracer control system, a first movable member, a second movable member mounted on said first movable member for motion in a direction at substantially right angles to the direction of motion of said first movable member, first and second motors connected to respectively drive said first and second movable members, a tracer head mounted on said second movable member, a relatively stationary template, said tracer head having a tracer finger arranged to cooperate with said template, said tracer finger being deflected by said template, first signal means signalling deflection of said tracer finger in the direction of motion of said first movable member, means connecting said first signalling means to control said second motor, said tracer head having a second signalling means to signal tracer finger deflections in the direction of motion of said second movable member, means connecting said second signalling means to control said first motor, said tracer head having a third signalling means to signal the total tracer finger deflection, means connecting said third signalling means to control said first and second motors so that tracer finger deflection is maintained substantially constant.

11. In a tracer system, a first motor driven movable member, a second movable member mounted on said first movable member and motor driven in a direction at substantially right angles to the direction of motion of said first movable member, a tracer head, a relatively stationary template, said tracer head having a tracer finger arranged to cooperate with said template, said tracer finger being deflected by said template, first signal means signalling deflection of said tracer finger in the direction of motion of said first movable member, means connecting said first signalling means to control the motor which moves second movable member, said tracer head having a second signalling means to signal tracer finger deflections in the direction of motion of said second movable member, means connecting said second signalling means to control the motor driving said first movable member, said tracer finger head having a third signalling means to signal the total tracer deflection, means connecting said third signalling means to control the motors connected to drive both said first and second movable members to maintain tracer finger deflection substantially constant, and first and second rate transducers respectively connected to the motors driving said first and second members and arranged to maintain the velocity of said first and second members.

12. In a tracer system, first and second members arranged to move at substantially right angles to each other, said second member being superposed on said first member, first and second motors respectively connected to said first and second members to move them along their respective paths of motion, a tracer head having first and second signalling elements arranged to detect deflections in the directions of said first and second movable members, said first signalling element signalling deflections and being connected to control said second motor and said second signalling element signalling deflections and being connected to control said first motor, a third signalling element in said tracer head to signal the total vector sum of the signals emitted from the said first and second signalling elements, said third signalling element being connected to both said first and second motors in such a manner as to keep said vector sum constant.

13. The structure of claim 12 wherein first and second rate transducers are respectively connected to said first and second motors, said rate transducers each emitting a signal to its respective motor to keep said motors operating at a substantially constant rate.

14. In a tracer system, a movable member, pattern and tracer means relatively movable in accordance with movement of said member, the provision of first and second signalling devices in said tracer and each having an output, a tracer finger in said tracer to be movable under influence of said pattern, means connecting said first and second signalling devices to have the outputs thereof variable with tracer finger movement in first and second perpendicular paths, respectively, with said first path parallel to movement of said member, primary means to control movement of said member in accordance with the output of said second signalling device, means developing a third signal proportional to the total tracer finger movement along said first and second paths, and compensation means to additionally control movement of said member in accordance with the output of said first signalling device and said third signal.

15. In a tracer system, first and second members movable perpendicularly and one carrying the other thereof for a compound movement, pattern and tracer means relative movable, the provision of first and second signalling devices in said tracer and each having an output, a tracer finger in said tracer to move each said signalling device under influence of said pattern, means connecting said first and second signalling devices to partake of tracer finger movement in first and second paths, respectively, parallel to movements of said first and second members, primary means to control movement of said first and second members in accordance with the outputs of said second and first signalling devices, respectively, means developing a third signal directly proportional to the vector resultant of tracer finger movements along said first and second paths, and compensation means to additionally control movement of said first and second members in accordance with the output of said first and second signalling devices, respectively, and each modified by said third signal.

16. In a tracer system, first and second members movable perpendicularly and one carrying the other thereof for a compound movement, pattern and tracer means relatively movable, the provision of first, second, and third signalling devices in said tracer and each having an output, a tracer finger in said tracer to move each said signalling device under influence of said pattern means, said first signalling device connected to partake of tracer finger movement in a first path parallel to movement of said first member, said second signalling device connected to partake of tracer finger movement in a second path parallel to movement of said second member, primary means to control movement of said first and second members in accordance with the output of said second and first signalling devices, respectively, said third signalling device connected to partake of tracer finger movement in a direction parallel to a plane defined by said first and second paths, and corrective means to control movement of said first and second members in accordance with the outputs of said first and second signalling devices, respectively, each modified alike by said third signalling device.

17. In a tracer system, an axis, first and second movable slides movable parallel to and perpendicular to the axis, respectively, and one carrying the other thereof for a compound movement, pattern and tracer means relatively movable in accordance with movement of said carried slide, the provision of first, second, and third signalling devices in said tracer and each having an output, a tracer finger in said tracer to move each said signalling device under influence of said pattern, said first signalling device connected to partake of tracer finger movement in a first path parallel to said axis, said second signalling device connected to partake of tracer finger movement in a second path perpendicular to said axis, means to control movement of said first and second slides in accordance with the outputs of said second and first signalling devices, respectively, said third signalling device connected to partake of tracer finger movement in a direction parallel to a plane defined by said first and second paths, and means controlled by said third signalling device controlling the speed of movement of both said first and second slides to maintain substantially constant the vector sum of speed of compound movement of said carried slide.

References Cited in the file of this patent

UNITED STATES PATENTS

| | | |
|---|---|---|
| 1,611,961 | Thompson | Dec. 28, 1926 |
| 2,436,373 | Barnes | Feb. 24, 1948 |
| 2,634,644 | Johnson | Apr. 14, 1953 |
| 2,674,099 | Mason et al. | Apr. 6, 1954 |
| 2,735,405 | Hipple | Feb. 21, 1956 |
| 2,835,466 | Rosebrook | May 20, 1958 |